United States Patent
Garnaud et al.

(10) Patent No.: US 12,129,795 B2
(45) Date of Patent: Oct. 29, 2024

(54) AIR INLET DUCT FOR A NACELLE OF AN AIRCRAFT PROPULSION ASSEMBLY

(71) Applicant: SAFRAN AIRCRAFT ENGINES, Paris (FR)

(72) Inventors: Quentin Matthias Emmanuel Garnaud, Moissy-Cramayel (FR); Antoine Elie Hellegouarch, Moissy-Cramayel (FR); Nicolas Joseph Sirvin, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 338 days.

(21) Appl. No.: 17/598,987

(22) PCT Filed: Mar. 19, 2020

(86) PCT No.: PCT/FR2020/050594
§ 371 (c)(1),
(2) Date: Sep. 28, 2021

(87) PCT Pub. No.: WO2020/201658
PCT Pub. Date: Oct. 8, 2020

(65) Prior Publication Data
US 2022/0177149 A1   Jun. 9, 2022

(30) Foreign Application Priority Data
Apr. 2, 2019 (FR) ........................................ 1903499

(51) Int. Cl.
*F02C 7/057* (2006.01)
*B64D 33/02* (2006.01)
*F02C 7/042* (2006.01)

(52) U.S. Cl.
CPC .............. *F02C 7/057* (2013.01); *B64D 33/02* (2013.01); *F02C 7/042* (2013.01); *F05D 2260/50* (2013.01)

(58) Field of Classification Search
CPC .. F02C 7/04; F02C 7/042; F02C 7/047; F02C 7/057
See application file for complete search history.

(56) References Cited

U.S. PATENT DOCUMENTS 3,400,902 A * 9/1968 King .......................... F02C 7/05
55/306
4,047,911 A * 9/1977 Krojer ....................... F02C 7/05
55/306

(Continued)

FOREIGN PATENT DOCUMENTS

CN   101523030 A   9/2009
CN   101855135 A   10/2010

(Continued)

OTHER PUBLICATIONS

International Search Report mailed Jul. 6, 2020, issued in corresponding International Application No. PCT/FR2020/050594, filed Mar. 19, 2020, 5 pages.

(Continued)

*Primary Examiner* — Craig Kim
(74) *Attorney, Agent, or Firm* — CHRISTENSEN O'CONNOR JOHNSON KINDNESS PLLC

(57) ABSTRACT

An air inlet duct or a nacelle of an aircraft propulsion assembly includes an annular body and an annular air inlet lip with two coaxial annular walls, inner and outer, respectively. The inner wall defining a portion of an inner annular surface of the air inlet duct and the outer wall defining a portion of an outer annular surface of the air inlet duct. A control system translates the lip from a first position, in which the lip is attached to the body, to a second position, (Continued)

in which the lip is axially separated from the body. An annular row of grilles is translatably secured to the lip. The grilles are housed inside the body in the first position and extended from the body in order for an air flow entering the air inlet duct to pass therethrough in the second position.

19 Claims, 3 Drawing Sheets

(56) References Cited

U.S. PATENT DOCUMENTS

| | | | | |
|---|---|---|---|---|
| 5,014,933 | A * | 5/1991 | Harm | B64D 33/02 |
| | | | | 181/220 |
| 5,609,313 | A | 3/1997 | Cole et al. | |
| 5,778,659 | A * | 7/1998 | Duesler | F02K 1/72 |
| | | | | 244/110 B |
| 8,408,491 | B2 * | 4/2013 | Jain | F02C 7/042 |
| | | | | 415/126 |
| 9,719,421 | B2 * | 8/2017 | Todorovic | B64D 29/00 |
| 9,816,462 | B2 * | 11/2017 | Guerin | F02K 1/763 |
| 10,082,079 | B2 * | 9/2018 | Todorovic | F02K 1/72 |
| 10,221,764 | B2 * | 3/2019 | Labrecque | F02C 7/045 |
| 10,399,687 | B2 * | 9/2019 | Kawai | F01D 17/105 |
| 10,514,004 | B2 * | 12/2019 | Crawford | F02K 1/605 |
| 10,995,701 | B2 * | 5/2021 | Palanisamy | F02K 1/763 |
| 11,149,637 | B2 * | 10/2021 | Todorovic | B64D 29/06 |
| 11,428,123 | B2 * | 8/2022 | Rose | F02C 7/04 |
| 11,661,887 | B2 * | 5/2023 | Labrecque | F02C 7/042 |
| | | | | 204/279 |
| 11,840,987 | B2 * | 12/2023 | Wood | F02K 1/72 |
| 2010/0084507 | A1 | 4/2010 | Vauchel et al. | |
| 2010/0148012 | A1 * | 6/2010 | McDonough | B64D 29/00 |
| | | | | 244/53 B |
| 2010/0242428 | A1 | 9/2010 | Vauchel et al. | |
| 2010/0252689 | A1 | 10/2010 | Vauchel et al. | |
| 2011/0219738 | A1 | 9/2011 | Joret et al. | |
| 2014/0127001 | A1 * | 5/2014 | Todorovic | B64D 29/00 |
| | | | | 415/127 |
| 2014/0352797 | A1 * | 12/2014 | Aten | F02K 3/06 |
| | | | | 137/15.1 |
| 2015/0097056 | A1 * | 4/2015 | Caruel | F02K 1/766 |
| | | | | 239/265.19 |
| 2015/0260126 | A1 * | 9/2015 | Caruel | F02K 1/72 |
| | | | | 239/265.19 |
| 2015/0285185 | A1 * | 10/2015 | Caruel | F02K 1/72 |
| | | | | 239/265.19 |
| 2017/0158341 | A1 * | 6/2017 | Kawai | F01D 17/16 |
| 2017/0321633 | A1 * | 11/2017 | Boileau | F02C 7/20 |
| 2018/0283276 | A1 | 10/2018 | Todorovic | |
| 2018/0298844 | A1 * | 10/2018 | Allut | F02K 1/766 |
| 2020/0385135 | A1 * | 12/2020 | Cochran | B64D 33/02 |
| 2022/0177149 | A1 * | 6/2022 | Garnaud | B64D 33/02 |
| 2023/0228230 | A1 * | 7/2023 | Alstad | F02K 1/72 |
| | | | | 60/226.2 |

FOREIGN PATENT DOCUMENTS

| | | | | |
|---|---|---|---|---|
| CN | 101909998 | A | | 12/2010 |
| CN | 102209667 | A | | 10/2011 |
| CN | 104364508 | A * | 2/2015 | ............... F02K 1/09 |
| EP | 3921527 | B1 * | 3/2023 | ............. B64D 15/04 |
| FR | 2 936 492 | A1 | | 4/2010 |
| FR | 2 938 237 | A1 | | 5/2010 |
| FR | 3124230 | A1 * | 12/2022 | ............... F02K 1/72 |

OTHER PUBLICATIONS

Written Opinion mailed Jul. 6, 2020, issued in corresponding International Application No. PCT/FR2020/050594, filed Mar. 19, 2020, 5 pages.

English translation of Written Opinion mailed Jul. 6, 2020, issued in corresponding International Application No. PCT/FR2020/050594, filed Mar. 19, 2020, 4 pages.

International Preliminary Report on Patentability mailed Sep. 28, 2021, issued in corresponding International Application No. PCT/FR2020/050594, filed Mar. 19, 2020, 6 pages.

First Chinese Office Action mailed Oct. 17, 2023, issued in corresponding Chinese Patent Application No. 202080025428.5, filed Mar. 19, 2020, 7 pages.

* cited by examiner

AIR INLET DUCT FOR A NACELLE OF AN AIRCRAFT PROPULSION ASSEMBLY

FIELD OF THE DISCLOSURE

The disclosure relates to the field of aeronautics, and more particularly, to an air inlet duct for a nacelle of an aircraft propulsion assembly.

BACKGROUND

The prior art comprises in particular the documents U.S. Pat. Nos. 3,400,902, 4,047,911 and US-2014/127001.

A propulsion assembly comprises an engine of the turbomachine type that is surrounded by a nacelle. If the turbomachine is a dual flow turbojet engine, the airflow passing through the air inlet duct passes through a fan blading and then splits into a primary airflow that enters in the turbomachine and a secondary airflow that flows around the turbomachine.

The nacelle comprises an air inlet duct, a middle structure and a downstream structure all connected to form a secondary airflow vein.

The air inlet duct comprises, on the one hand, an air inlet lip arranged to allow the optimal capture of the air necessary to supply the engine, over its entire operating range, while minimizing losses and drag, and on the other hand, a body on which the lip is attached, and which is intended to channel the air properly towards the fan blading.

The applications FR2936492A1 and FR2938237A1 describe such air inlet ducts, the lips of which are contiguous to the bodies when the aircraft is moving but are configured to move away from the body when the aircraft is on the ground to facilitate maintenance of the nacelle.

At low speeds (e.g. on the ground, during the takeoff or the landing), unfavorable conditions such as high angles of attack of the aircraft or a crosswinds (i.e. a wind not parallel to a longitudinal axis of the nacelle) can result in a reduction in the air flow rate captured by the air inlet duct. However, maintaining this flow rate above a limit threshold is essential in order not to adversely affect the operability of the engine and generate limitations on its uses.

In addition, the current trend is to reduce the length of the nacelles and consequently of the air inlet ducts, which reduces their capacity to capture the air, in particular under the unfavorable conditions described above.

The present disclosure provides a simple, effective and economical remedy to the above problem.

SUMMARY

To this end, the disclosure proposes an air inlet duct for a nacelle of an aircraft propulsion assembly, this duct comprising an annular body and an annular air inlet lip comprising two coaxial annular walls, inner and outer respectively, the inner wall defining a portion of an inner annular surface of the air inlet duct and the outer wall defining a portion of an outer annular surface of the air inlet duct, the air inlet duct further comprising a control system for moving the lip in axial translation relative to the body, from a first position in which the lip is joined to the body to a second position in which the lip is axially spaced apart from the body. According to the disclosure, the air inlet duct further comprises an annular row of grilles secured in translation with the lip, and which are configured so as to be, in the first position, housed in the body and, in the second position, extended from the body and intended to be traversed by an airflow entering the air inlet duct.

According to the disclosure, the duct comprises at least one guiding system of the lip in translation with respect to the body, which is of the rail and slide type.

Thus, by providing a distance between the lip and the body on the one hand and inserting grilles therein on the other hand, the disclosure allows a transverse air flow to enter the nacelle through this distance before being straightened by passing through the grilles in an optimized direction. The direction of the transverse airflow after being straightened by the grilles can be chosen in particular to reduce the risks of air separation in the air inlet duct and therefore to reduce the risks of distortion of the airflow supplying the turbomachine and its fan. This straightening also allows for a better distribution of the transverse air flow entering the engine and thus to increase its air capture surface. The disclosure thus allows to prevent parts of the engine, in particular peripheral parts (i.e. those located close to the nacelle), from having little or no air flow through them.

The air inlet duct according to the disclosure thus allows to increase the flow rate of the airflow captured by the air inlet duct, to direct it better and to improve its distribution inside the nacelle, in particular in the unfavorable conditions described above. The engine thus gains in performance and operability. Furthermore, the disclosure has the advantage of allowing the grilles to be housed in the body without modifying the external structure of the lip.

The air inlet duct according to the disclosure may comprise one or more of the following characteristics, taken alone with each other or in combination with each other:
  the control system comprises at least one actuator oriented substantially parallel to a longitudinal axis of the air inlet duct,
  the two coaxial annular walls are connected to each other by a transverse reinforcing annular wall, and
  the reinforcing wall defines, with the inner and outer walls, an annular reception compartment traversed by a circulation pipe of a fluid for de-icing the lip.

The disclosure further relates to an aircraft propulsion assembly comprising a nacelle equipped with a duct as described above.

DESCRIPTION OF THE DRAWINGS

The disclosure will be better understood, and other details, characteristics and advantages of the present disclosure will become clearer from the following description made by way of non-limiting example and with reference to the attached drawings, in which.

DETAILED DESCRIPTION

A propulsion assembly 10 comprises an engine or a turbomachine which is surrounded by a nacelle 26.

Figure 1:
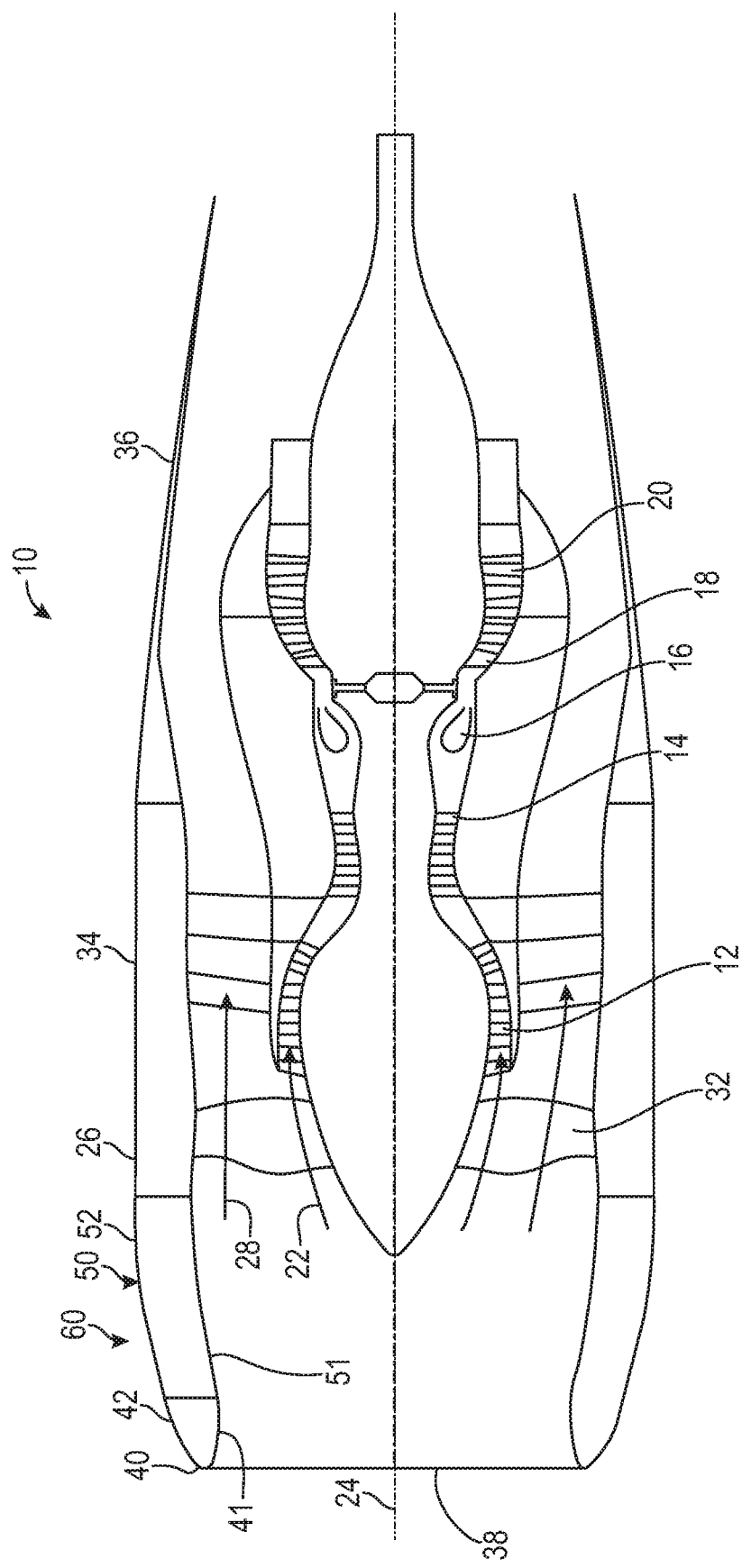
FIG. 1 is a schematic view in axial section of an aircraft propulsion assembly.

With reference to FIG. 1, the turbomachine is a dual flow turbomachine which comprises, from upstream to downstream in the direction of gas flow, a low-pressure (LP) compressor 12, a high-pressure (HP) compressor 14, an annular combustion chamber 16, a high-pressure (HP) turbine 18 and a low-pressure (LP) turbine 20, which define a flow vein for a primary gas flow 22.

The rotor of the high-pressure turbine 18 is integral with the rotor of the high-pressure compressor 14 so as to form a high-pressure body, and the rotor of the low-pressure turbine 20 is integral with the rotor of the low-pressure compressor 12 so as to form a low-pressure body. The rotor of each turbine rotates the rotor of the associated compressor about a longitudinal axis 24 by the thrust of the gases from the combustion chamber 16.

In the following description, the terms upstream and downstream refer to the flow of gases in the turbomachine along the longitudinal axis 24, and the terms upstream, downstream, radial, transverse, etc., are to be considered as being defined with respect to this longitudinal axis 24 or referring to this longitudinal axis 24.

The nacelle 26 comprises, from upstream to downstream, an air inlet duct 60, a middle structure 34 and a downstream structure 36 connected to each other so as to extend around the turbomachine and define around it an annular flow vein for a secondary flow 28.

The air inlet duct 60 comprises an annular air inlet lip 40 adapted to allow the optimal capture of the air required to supply a fan 32 of the turbomachine. This air then splits to form the aforementioned primary 22 and secondary 28 flows.

The lip 40 defines a transverse inlet 38 of the nacelle 26 allowing the air to enter the nacelle. This lip 40 comprises two annular walls 41, 42 coaxial with the longitudinal axis 24, respectively internal 41 and external 42.

The inner wall 41 defines a portion of an inner annular surface of the air inlet duct 60 allowing to capture the air flows and to guide them to the fan 32. The inner wall 41 is thus part of the annular vein of the nacelle. In contrast, the outer wall 42 defines a portion of an outer annular surface of the air inlet duct 60.

The air inlet duct 60 also comprises an annular body 50 comprising an inner body wall 51 and an outer body wall 52. The inner body wall 51 defines a further portion of the inner annular surface of the air inlet duct 60 and thus allows to guide the flow of air entering the nacelle 26 from the lip 40 to the fan 32. Like the inner wall 41 of the lip 40, the inner body wall 51 forms part of the annular flow vein of the nacelle 26. In contrast, the outer body wall 52 defines another portion of the outer annular surface of the air inlet duct 60.

Figure 2:
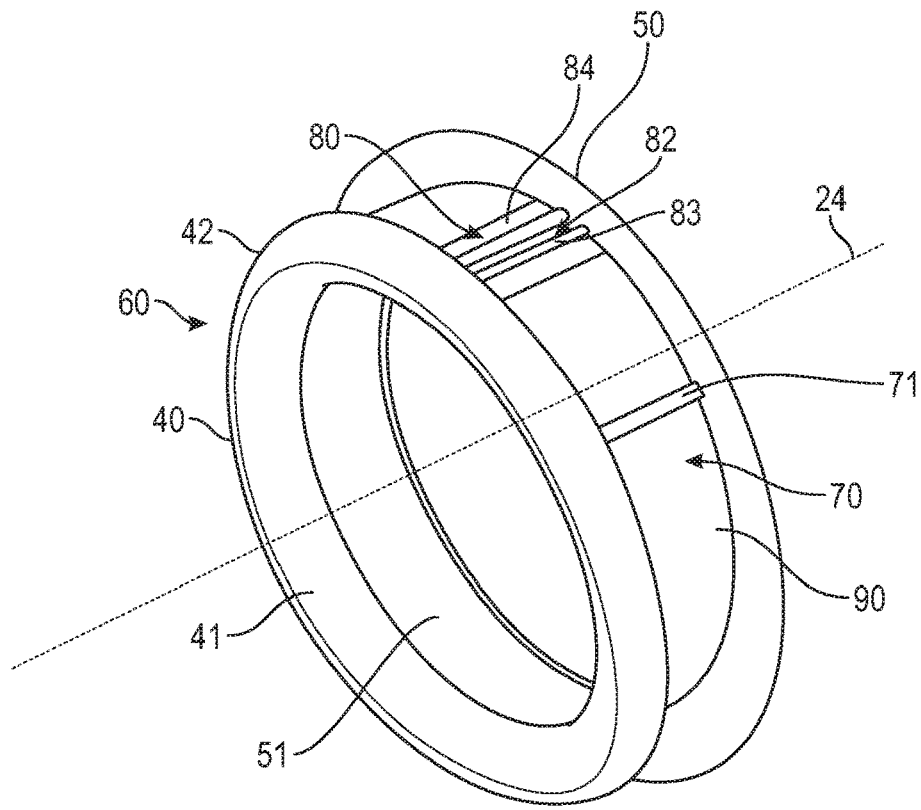
FIG. 2 is a perspective view of an air inlet duct in a first position.

FIG. 2 shows the air inlet duct 60 according to the disclosure comprising the annular body 50 and the annular air inlet lip 40 as previously described. In this figure as well as in FIG. 3, the outer body wall of the body 50 is not shown for ease of disclosure of the disclosure.

The air inlet duct 60 comprises here a control system 70 for the axial translational movement of the lip 40 relative to the body 50, i.e. parallel to the longitudinal axis 24.

The control system 70 is thus arranged to move the lip 40 from a first position (FIG. 2), in which the lip 40 is joined to the body 50, to a second position (FIG. 3) in which it is axially remote from the body 50.

For this purpose, the control system 70 comprises, for example, at least one actuator 71, in this case four actuators 71, in particular electric or hydraulic. In particular, they are oriented substantially parallel to the longitudinal axis 24 of the air inlet duct 60 so as to push the lip 40 from the first position shown in FIG. 2 to the second position shown in FIG. 3 and so as to be able to pull the lip 40 in the opposite direction.

The duct 60 of FIG. 2 also comprises at least one system 80 for guiding in translation the lip 40 with respect to the body 50.

Figure 3:
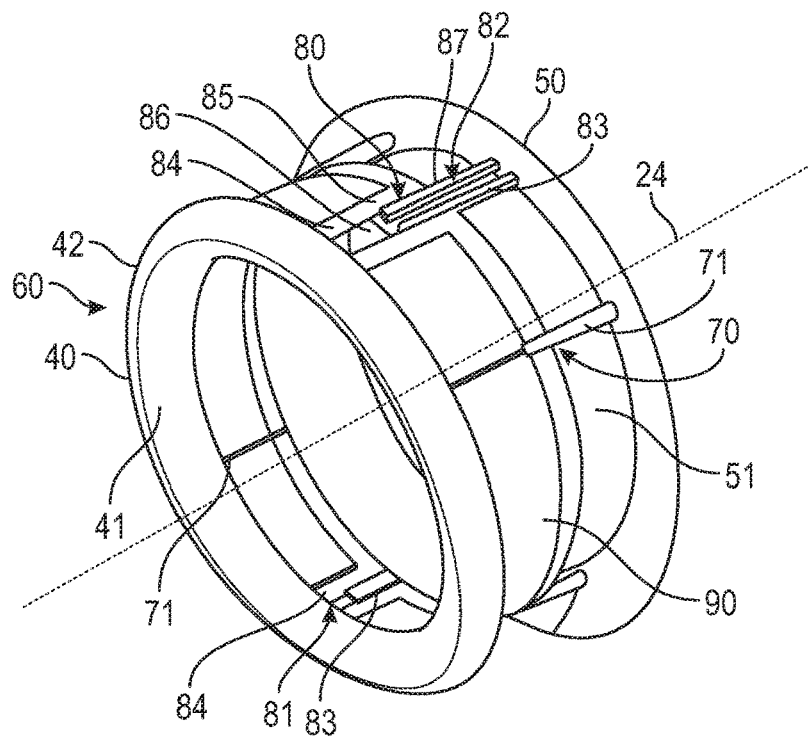
FIG. 3 is a perspective view of the air inlet duct of FIG. 2 in a second position.

The guiding system 80 is here of the rail and slide type and comprises for example a lower system 81 and an upper system 82 as seen in FIG. 3. The lower 81 and upper 82 systems each comprise a rail 83 and a slide 84. The rail 83 is located here on the body 50, in particular on the inner body wall 51 and the slide on the lip 40. The rail 83 and the slide 84 are configured to guide the lip 40 parallel to the longitudinal axis 24 as it moves from the first position to the second position and vice versa. The slide 84 comprises, for example, two edges 85 spaced apart so as to define a gap 86. The rail 83 comprises, for example, two profiles 87 shaped like a U arranged to be accommodated in the gap 86 in the first position and to free the gap 86 in the second position. The edges 85 and the profiles 87 are configured to allow the axial movement of the lip 40 relative to the body 50 and prevent any other type of movement.

When the lip 40 is in the first position, it is releasably attached to the body 50 by at least one flange, for example located on the inner wall 41 of the lip 40 and the inner body wall 51 of the body 50 and/or on the outer wall 42 of the lip 40 and the outer body wall 52 of the body.

When the lip is moved from the second position to the first position, the lip 40 is centered relative to the body, in particular by means of a centering finger located on one element among the lip 40 and the body 50 and a location with a shape complementary to the finger and arranged on the other of the elements among the lip 40 and the body 50.

Figure 4:
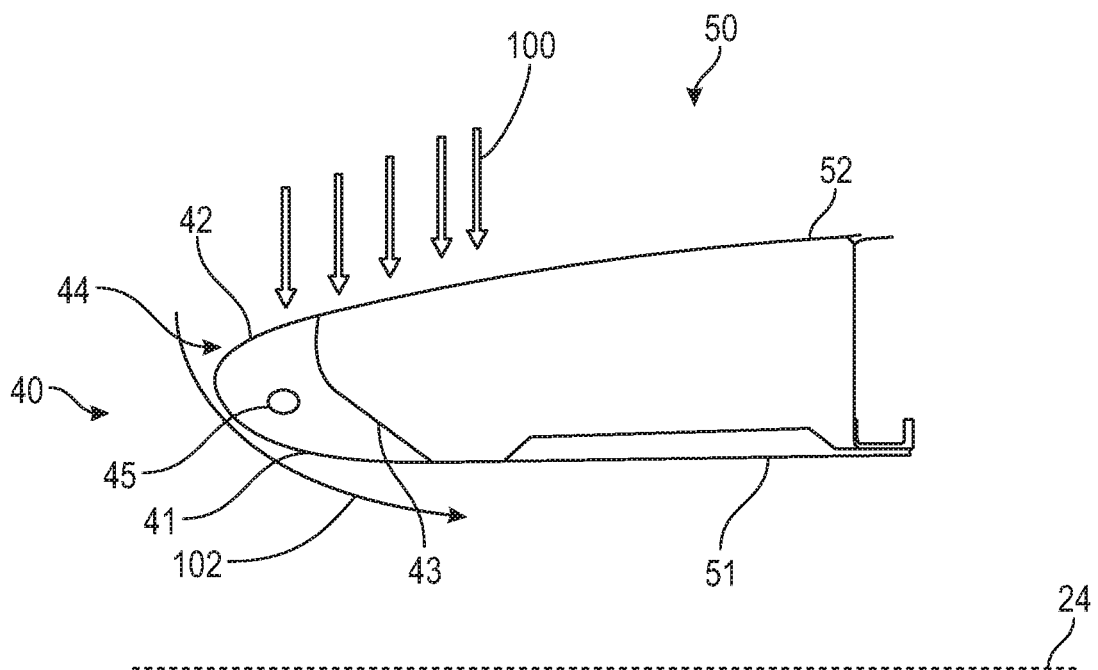
FIG. 4 is a schematic half-view, in axial section, of the air inlet duct in the first position.

Referring now to FIGS. 4 (first position of the lip 40) and 5 (second position of the lip 40), when the lip 40 is in the first position, a transverse airflow 100 towards the air inlet duct 60 in a direction transverse to the longitudinal axis 24 is prevented from entering the nacelle, in particular by the outer wall 42 of the lip and the outer body wall 52. On the other hand, when the lip 40 is in the second position, i.e. in a position spaced apart from the body 50, a lateral inlet 46 is created between the lip 40 and the body 50, and this same transverse airflow 100 is then free to enter the air inlet duct 60 through the lateral inlet 46. The longitudinal translation of the lip 40 with respect to the body 50 thus allows to increase the flow rate of air captured by the air inlet duct 60 without modifying the cross-section of the transverse inlet. The air flows 102 entering the nacelle through the transverse inlet of the nacelle are therefore not disturbed by the disclosure.

The lip 40 further comprises an annular row of grilles 90. This annular row of grilles 90 is secured in translation with the lip 40. In particular, the grilles are configured to be, in the first position (FIG. 4), housed in the body 50, and, in the second position (FIG. 5), extended from the body 50 and intended to be traversed by the transverse airflow 100.

Figure 5:
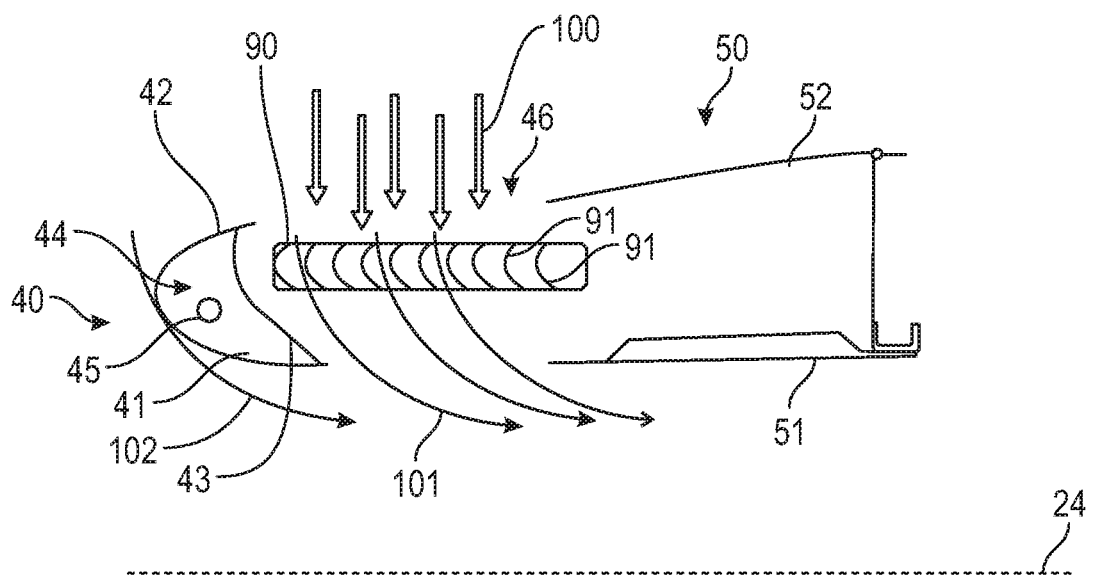
FIG. 5 is a schematic half-view, in axial section, of the air inlet duct in the second position.

The grilles 90 comprise fins 91 that guide the transverse airflow 100 as it enters the nacelle through the side inlet 46 in a direction illustrated by the arrows referenced 101 in FIG. 5. The disclosure thus allows the fins 91 to be configured to optimize the direction of the transverse airflow 100 for the purpose of optimizing the performance of the engine.

The grilles 90 prevent birds from entering the nacelle through the side inlet 46 and thus have a function to protect against bird collusion.

Returning to FIG. 3, the slide or the slides 84 are in particular provided in the grilles 90. Thus, when the lip 40 is in the second position, the airflow can enter the nacelle through the grilles 90 and/or through the slide 84, in particular through the gap 86.

The disclosure is advantageous for all types of nacelles and in particular for nacelles with large cross sections. Indeed, the larger the cross-sectional diameter of the nacelle, the larger the circumference of the nacelle, and the larger the side inlet 46 will be. The effect of the side inlet 46 on the air flow rate entering the nacelle is thus accentuated on nacelles with large cross-sections.

The lip 40 comprises, for example, an annular transverse reinforcing wall 43. This reinforcing wall 43 defines, with the inner 41 and outer 42 walls, an annular reception compartment 44 through which a pipe 45 for the circulation of a de-icing fluid for the lip 40 runs. The disclosure thus allows compatibility with an effective de-icing system, preventing the lip 40 which is directly subjected to external weather conditions from icing up.

In the event of a problem, the air inlet duct 60 will remain in the normally closed position, i.e. the first position.

The invention claimed is:

1. An air inlet duct for a nacelle of an aircraft propulsion assembly, said air inlet duct comprising:
    an annular body,
    an annular air inlet lip comprising two coaxial annular walls, respectively inner and outer, the inner annular wall defining a portion of an inner annular surface of the air inlet duct and the outer annular wall defining a portion of an outer annular surface of the air inlet duct,
    a control system configured to move the annular air inlet lip in axial translation relative to said annular body, from a first position in which the annular air inlet lip is joined to said annular body to a second position in which the annular air inlet lip is axially spaced apart from said annular body, and
    an annular row of grilles secured in translation with the annular air inlet lip and which are configured to be, in said first position, housed in said annular body, and, in said second position, extended from said annular body positioned to be traversed by an airflow entering the air inlet duct,
    wherein the air inlet duct further comprises at least one guiding system of the annular air inlet lip in translation with respect to said annular body, which is of a rail and slide type, and the annular inlet lip is releasably attached to the annular body by at least one flange when the annular inlet lip is in the first position, and the at least one flange is located on the inner annular wall of the annular air inlet lip and an inner body wall of the annular body, or on the outer annular wall of the annular air inlet lip and an outer body of the annular body.

2. The duct according to claim 1, wherein said control system comprises at least one actuator oriented parallel to a longitudinal axis of the air inlet duct.

3. The duct according to claim 1, wherein said walls are connected to each other by a transverse reinforcing annular wall.

4. The duct according to claim 3, wherein the reinforcing annular wall defines with the inner and outer annular walls an annular reception compartment traversed by a circulation pipe of a fluid that de-ices the annular air inlet lip.

5. An aircraft propulsion assembly comprising a nacelle equipped with air inlet duct according to claim 1.

6. The duct according to claim 1, wherein the rail is located on the annular body and the slide is located on the annular air inlet lip, the rail and the slide being configured to guide the annular air inlet lip parallel to a longitudinal axis of the air inlet duct during said air inlet duct moves from the first position to the second position and vice versa.

7. The duct according to claim 6, wherein the slide is provided in the annular row of grilles so that the airflow enters the nacelle by passing through the annular row of grilles and/or through the slide when the annular air lip is in second position.

8. The duct according to claim 1, wherein the slide comprises two edges spaced apart so as to define a gap, the rail comprises two U-shaped profiles arranged to be accommodated in the gap in the first position and to free the gap in the second position, in which the edges and the U-shaped profiles being configured to allow an axial movement of the annular inlet lip relative to the annular body and prevent any other type of movement.

9. An air inlet duct for a nacelle of an aircraft propulsion assembly, said air inlet duct comprising:
    an annular body,
    an annular air inlet lip comprising two coaxial annular walls, respectively inner and outer, the inner annular wall defining a portion of an inner annular surface of the air inlet duct and the outer annular wall defining a portion of an outer annular surface of the air inlet duct,
    a control system configured to move the annular air inlet lip in axial translation relative to said annular body, from a first position in which the annular air inlet lip is joined to said annular body to a second position in which the annular air inlet lip is axially spaced apart from said annular body,
    an annular row of grilles secured in translation with the annular air inlet lip and which are configured to be, in said first position, housed in said annular body, and, in said second position, extended from said annular body positioned to be traversed by an airflow entering the air inlet duct,
    wherein the air inlet duct further comprises at least one guiding system of the annular air inlet lip in translation with respect to said annular body, which is of a rail and slide type,
    wherein the rail is located on the annular body and the slide is located on the annular air inlet lip, the rail and the slide being configured to guide the annular air inlet lip parallel to a longitudinal axis of the air inlet duct during said air inlet duct moves from the first position to the second position and vice versa, and
    wherein the slide comprises two edges spaced apart so as to define a gap, the rail comprises two U-shaped profiles arranged to be accommodated in the gap in the first position and to free the gap in the second position, in which the edges and the U-shaped profiles being configured to allow an axial movement of the annular inlet lip relative to the annular body and prevent any other type of movement.

10. An aircraft propulsion assembly comprising a nacelle equipped with air inlet duct according to claim 9.

11. An air inlet duct for a nacelle of an aircraft propulsion assembly, said air inlet duct comprising:
    an annular body,
    an annular air inlet lip comprising two coaxial annular walls, respectively inner and outer, the inner annular wall defining a portion of an inner annular surface of the air inlet duct and the outer annular wall defining a portion of an outer annular surface of the air inlet duct, a control system configured to move the annular air inlet lip in axial translation relative to said annular body, from a first position in which the annular air inlet lip is joined to said annular body to a second position in which the annular air inlet lip is axially spaced apart from said annular body, and an annular row of grilles secured in translation with the annular air inlet lip and which are configured to be, in said first position, housed in said annular body, and, in said second position, extended from said annular body positioned to be traversed by an airflow entering the air inlet duct, wherein the air inlet duct further comprises at least one guiding system of the annular air inlet lip in translation with respect to said annular body, which is of a rail and slide type, wherein the slide comprises two edges spaced apart so as to define a gap, the rail comprises two U-shaped profiles arranged to be accommodated in the gap in the first position and to free the gap in the second position, in which the edges and the U-shaped profiles being configured to allow an axial movement of the annular inlet lip relative to the annular body and prevent any other type of movement.

12. The duct according to claim 11, wherein said control system comprises at least one actuator oriented parallel to a longitudinal axis of the air inlet duct.

13. The duct according to claim 11, wherein said walls are connected to each other by a transverse reinforcing annular wall.

14. The duct according to claim 13, wherein the reinforcing annular wall defines with the inner and outer annular walls an annular reception compartment traversed by a circulation pipe of a fluid that de-ices the annular air inlet lip.

15. An aircraft propulsion assembly comprising a nacelle equipped with air inlet duct according to claim 11.

16. The duct according to claim 11, wherein the rail is located on the annular body and the slide is located on the annular air inlet lip, the rail and the slide being configured to guide the annular air inlet lip parallel to a longitudinal axis of the air inlet duct during said air inlet duct moves from the first position to the second position and vice versa.

17. The duct according to claim 16, wherein the slide is provided in the annular row of grilles so that the airflow enters the nacelle by passing through the annular row of grilles and/or through the slide when the annular air lip is in second position.

18. The duct according to claim 11, wherein the annular inlet lip is releasably attached to the annular body by at least one flange when the annular inlet lip is in the first position.

19. The duct according to claim 18, wherein the at least one flange is located on the inner annular wall of the annular air inlet lip and an inner body wall of the annular body, or on the outer annular wall of the annular air inlet lip and an outer body of the annular body.

* * * * *